United States Patent [19]
Barandiaran

[11] Patent Number: 5,516,082
[45] Date of Patent: May 14, 1996

[54] GAS CYLINDER

[75] Inventor: Javier Barandiaran, San Sebastian, Spain

[73] Assignee: Talleres Gain, S. Coop. S.L., Lezo, Spain

[21] Appl. No.: 258,491

[22] Filed: Jun. 10, 1994

[30] Foreign Application Priority Data

Jun. 25, 1993 [ES] Spain .................... 9301437

[51] Int. Cl.⁶ ...................................... F16F 5/00
[52] U.S. Cl. .................... 267/64.12; 267/64.22
[58] Field of Search .................. 188/300, 315, 188/322.14, 322.22; 267/64.11, 64.12, 64.13, 64.22

[56] References Cited

U.S. PATENT DOCUMENTS

| | | | |
|---|---|---|---|
| 3,656,593 | 4/1972 | Bauer | 188/300 |
| 4,386,760 | 6/1983 | Bauer | 267/64.12 |
| 4,728,084 | 3/1988 | Bauer et al. | |
| 4,779,851 | 10/1988 | Bauer | 188/300 |
| 5,090,770 | 2/1992 | Heinrichs | 267/69.12 |
| 5,273,259 | 12/1993 | Bauer | 267/64.12 |

FOREIGN PATENT DOCUMENTS

| | | |
|---|---|---|
| 0219362 | 4/1987 | European Pat. Off. . |
| 0217013 | 4/1987 | European Pat. Off. . |
| 2192251 | 2/1974 | France . |
| 2661229 | 10/1991 | France . |
| 3446408 | 7/1986 | Germany . |

Primary Examiner—Robert J Oberleitner
Assistant Examiner—C. T. Bartz
Attorney, Agent, or Firm—Jacobson, Price, Holman & Stern

[57] ABSTRACT

A gas cylinder with a valve plug made of two parts (4,5), which are fitted together by pressure. Of the two parts, the lower one (5) has an outer slot (7) with three sharp angles in it, which communicates the inter-cylinder space with the gas intake valve upwards of the piston. The intake valve shaft finishes at its lower end in a washer, which has a upper ring-shaped rabbet or offset. With this cylinder, the rate of flow of the gas is regulated and a greater safety margin is obtained in its operation.

11 Claims, 2 Drawing Sheets

GAS CYLINDER

This invention relates to gas cylinders of the type normally used to regulate seats. These cylinders are composed of two concentric tubes, of which the inner one is occupied by a piston operated by a ram or plunger. The space between the tubes is occupied by a gas and this gas travels from the interior of the inner cylinder to both sides of the piston, through gas passages or holes cut in a valve plug and in a shaft plug.

A gas cylinder of this type is described in Patent Application ES.9001140, which presents the valve plug and the shaft plug based on three parts which are assembled together. The valve plug formed, by means of two of its components, the passage for the gas between the inter-tube chamber and the piston, through the valve shaft, which means that it was not necessary to make any kind of holes to provide this necessary passage.

However, for certain applications, it was necessary to have a greater possibility of regulating the speed of circulation of the gas so that its behaviour was in tune with the falling and rising of the piston. To this effect, the cylinder presented there is limited to achieving only low speeds.

Moreover, in that cylinder, the valve plug was composed of three components assembled together, which meant that there was the risk, on some occasions, of these parts working loose and making the cylinder unusable.

Another disadvantage of the said cylinder was in the fact that during the assembly and once it had been completed, the cylinder might remain pressed down and consequently the passage of gas through the valve shaft gasket would remain open.

One object of the invention is to provide a gas cylinder with a valve plug consisting of only two parts fitted together by pressure, between which a passage for gas is formed, communicating the inter-cylinder space with the valve shaft, with the gas passage being in a broken line with at least three angles of 90° each.

A second object of the invention is the provision of a circular or ring-shaped rabbet on the upper end of the lower stop of the valve shaft, where the O-ring gasket is fitted.

A third object of the invention is the forming of lugs on one of the two components that make up the valve plug.

A final object of the invention is the provision of a double slot in one of the components that make up the valve plug.

To put these objectives into practice, a valve plug is made, consisting of two cylindrical components connected together by pressure, of which the lower one has one lower portion of a diameter that fits into the inner tube and another upper portion of a diameter that fits into the outer tube. The diameter of the upper component corresponds to that of the outer tube.

Both components have holes in their centres to allow the valve shaft to pass through, and are provided with the corresponding ring-shaped slots to house circular seals or gaskets.

The upper end of the lower part has a protruding neck, which is housed in the corresponding recess in the upper part. This lower part is provided with a superficial slot cut in a radial plane of the part, a slot which starts at the hole for the valve shaft to pass through, passes along the top and side of the protruding neck and continues in a horizontal line and then down the vertical side surface of the part.

The slot in question finishes exactly where the portion that fits into the outer tube ends, which means that this slot communicates with the inter-chamber space. Thus the slot provides a gas passage from the said space to the hollow interior of the part.

When the two parts have been assembled, the slot creates an internal channel that has three 90° bends or turn between one end and the other, and the gas collides with the walls, slowing down the speed at which it circulates, which produces a tendency to balance the lowering and raising stresses of the piston and make them more in accordance with each other.

At each of the said right angles in the gas passage, the gas collides against the walls and a braking of the flow speed takes place, with which the ratio between the expansion stress and the compression stress tends to be equalled out, with a maximum of the order of 8 to 10 Kg. being established.

With this, the pressure of the damper is better adjusted and greater smoothness of operation is achieved, as is greater sensitivity of the cylinder.

On top of the two parts that make up the valve plug, a plate-type metal washer is situated, by way of a protective shield to prevent the deformation of the said parts, which are usually made of injected plastic.

Besides, the valve shaft that passes through the interior of both parts is provided with an end in the form of a washer, above which an O-ring gasket is fitted. This washer is housed in a recess in the lowest portion of the lower part, pressing the O-ring seal so as to block the passage of gas between the area above the piston and the inter-cylinder space, through the previously mentioned angled slot that forms the gas passage.

The valve shaft is operated by a conventional ram or pusher, so that its movement is axial and opens the passage for the gas, on releasing the washer and the O-ring gasket from its connection with the intake if the lower part.

In the case of the present invention, the washer is provided with a circular rabbet or offset cut around the whole of its top edge. The provision of this rabbet allows the gasket to be inserted further into the cavity in the lower part of the valve plug, with which an amount of dead stroke or safety travel, during which the cylinder does not operate, is achieved.

This aspect of the invention is very important and advantageous for the assembly and operation, because it prevents the cylinder for remaining pushed down once the assembly has been carried out, and therefore eliminates the risk that the passage for the gas does not remain open. A greater of lesser degree of safety will be achieved, depending on the dimensions of the circular rabbet.

All these and other details of the invention will be better appreciated by referring to the sheets of drawings which are attached. These drawings, which are for guidance only, show the following:

Figure 1:
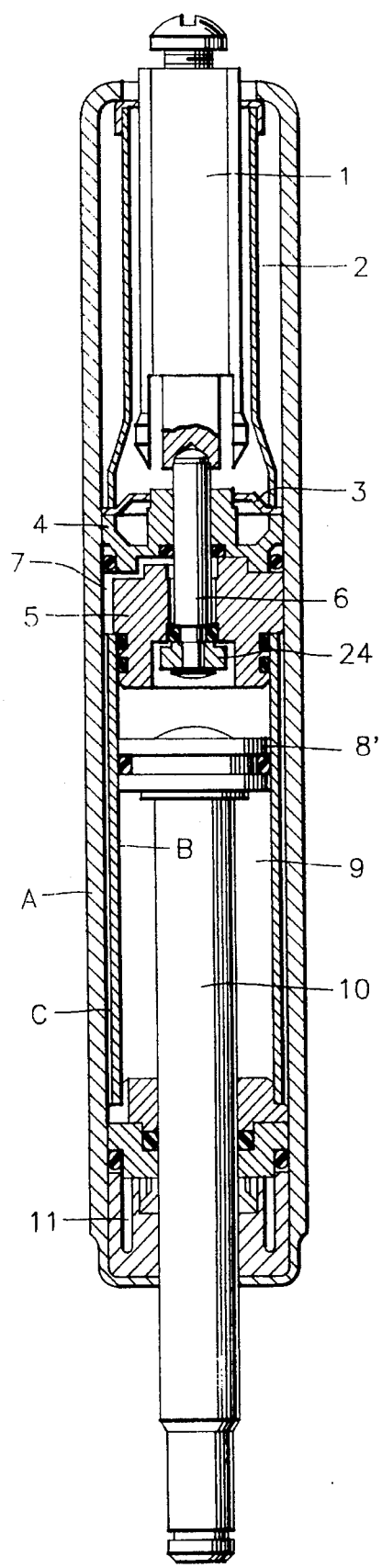
FIG. 1 is an elevation of the gas cylinder assembly, showing the invention.

Looking now at FIG. 1, we can see a gas cylinder, composed of a pusher (1) arranged inside the casing (2), which pushes the valve shaft (6). The casing (2) rests on the plate-type washer (3) fitted on top of the valve plug. The cylinder is composed of the two tubes (A, B), between which a chamber (C) occupied by gas is formed. The gas can travel through two routes, one is through the passage (7) towards the part above the piston (8') and the other is through the passage (11) in the shaft plug (10) towards the part below the piston (8'), so that according to where the piston is situated, the gas will occupy the position above or below the chamber (9).

It is possible to appreciate that the valve plug consists of two parts (4 and 5) (FIG. 2), while the shaft plug consists of three parts (12, 13 and 14) (FIG. 3), assembled together.

Of the two parts that make up the valve plug, the upper one (4) receives the plate-type washer (3) on its top (18) to act as a shield, and it has been hollowed out at 22' to make it lighter and save material. At the bottom, in another central hollowed-out area (17), it receives the protuberance (16) from the lower part (5) in such a way that when both parts (4 and 5) are assembled together, they form the valve plug.

Figure 2:
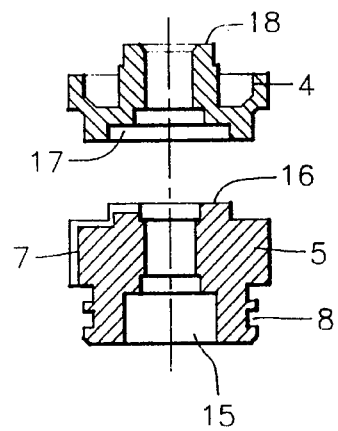
FIG. 2 represents the valve plug, divided into its constituent parts.
Figure 3:
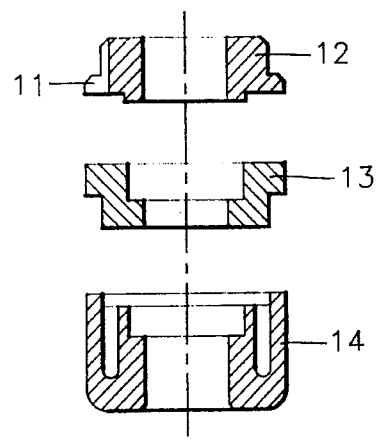
FIG. 3 represents the shaft plug, divided into its constituent parts.

FIGS. 1 and 2 show the shape of the slot (7) cut radially into the part (5), that runs open to the exterior with the three said sharp angles 19, 20, 21 in it, and communicating, as can be perceived, the space between cylinders with the centre of the part (5) through which the valve shaft passes.

On situating the upper part (4) onto the lower part (5), the slot forms a totally closed channel except at its ends. The depth or cross-section of the slot in the part (5) can be modified in order to vary the speed of the gas passing through it.

Figure 4:
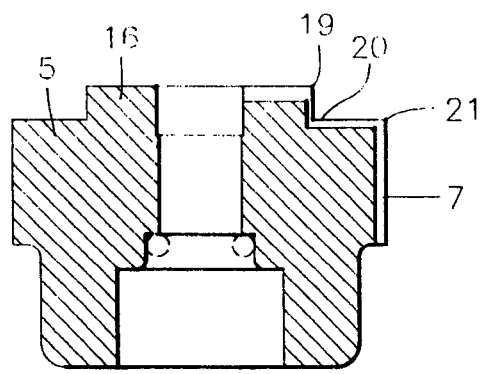
FIGS. 4 and 5 show two views of the lower of the two parts that make up the valve plug.
Figure 6:
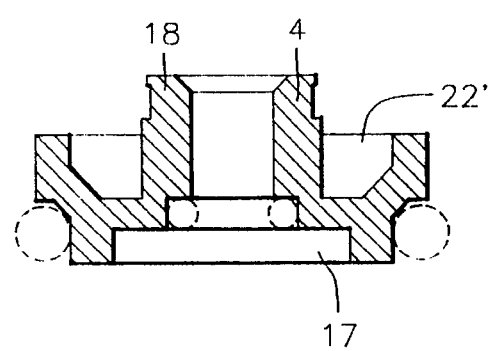
FIG. 6 is a sectional elevation of the upper part of the valve plug.
Figure 5:
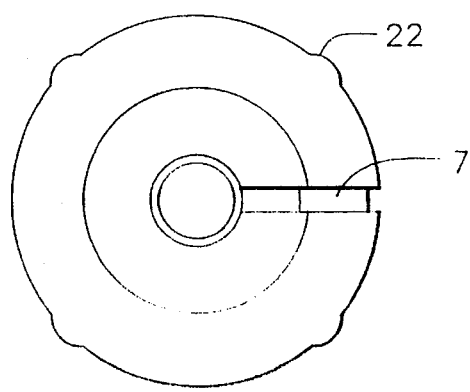

The details and general configuration of the parts (4 and 5) can be appreciated in greater detail in FIG. 4 and 5, which point out the existence of four lugs (22) as well as the exact position of the slot (7). The lugs in question are useful in the assembly, since they contribute to the fact that there is no excessive friction when the said portion of the part (5) is fitted into the outer tube.

FIG. 4 shows the part (5) before its lower portion has been machined to provide the two circular recesses (8), as illustrated in FIG. 2, in which gaskets or seals will be housed, as shown in FIG. 1.

Figure 7:
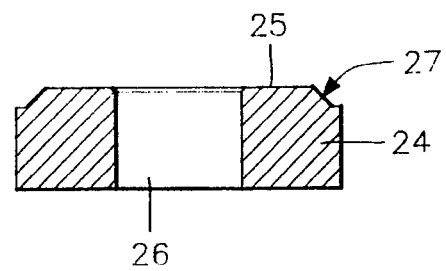
FIG. 7 shows a sectional elevation of the end washer on the valve shaft.

FIG. 7 shows the end washer (24) that is mounted on by axial passage 26 and closes the valve shaft (6) and on whose upper face 25 an O-ring gasket is received, both of which are responsible for opening and closing the passage of gas through the slot (7) when the shaft is moved axially during the operation of the cylinder.

Also prominent in FIG. 7 is the circular rabbet (27), which allows the O-ring gasket to be inserted further into the lower cavity (15) in the part (5) in order to provide an amount of dead stroke or safety travel.

I claim:

1. Gas cylinder comprising:
   two concentric cylinders including an inner cylinder and an outer cylinder with a space between them,
   a piston slidably mounted in a chamber of said inner cylinder, separating said chamber into two chamber sections,
   a gas travelling between said two chamber sections formed by said piston,
   a valve plug including only two parts,
   a shaft plug including three parts assembled together,
   said two parts of said valve plug being cylindrical parts, an upper one of said two parts having a protector on its top, and a lower one of said two parts being located partially inside said upper one by a neck portion and said lower one including a portion fitting against said outer cylinder and a portion fitting against said inner cylinder and in said neck portion, a slot of said lower part including at least three 90° angles extending in a vertical radially extending plane and including an upper horizontally oriented straight section of said slot terminating at a hollow centre of said lower one through which a valve shaft travels, with a washer at a lower end of said valve shaft having a ring-shaped rabbet in an outer edge of an upper surface, with said rabbet being located below a seating area for an O-ring gasket on said washer,
   said slot providing communication between said two chamber sections through said space between said inner cylinder and said outer cylinder via a portion of said slot adjacent to said outer cylinder and a passage defined by said shaft plug.

2. Gas cylinder, in accordance with claim 1, wherein said lower part of said valve plug is provided with a set of lugs on a surface adjacent to said outer cylinder.

3. Gas cylinder, in accordance with claim 1, wherein said lower one of said valve plug is provided with two ring-shaped recesses in said portion fitting against said inner cylinder for receiving O-ring gaskets.

4. A gas cylinder comprising:
   an outer cylinder,
   an inner cylinder mounted within said outer cylinder and defining a space therebetween,
   a piston rod extending through said outer cylinder,
   a piston mounted on said piston rod, said piston being slidably mounted in said inner cylinder to divide said inner cylinder into two chambers,
   a shaft plug slidably receiving said piston rod and engaging said outer cylinder and one end of said inner cylinder, said shaft plug including a passage communicating with said space and one of said two chambers,
   a valve plug engaging said outer cylinder and an opposite end of said inner cylinder, said valve plug including only two parts with a lower one of said two parts having a neck portion engaging a hollow area of an upper one of said two parts to secure said two parts together, and
   a slot defined by a peripheral surface of said lower one of said two parts extending in a vertical, radially extending plane and communicating with said space and an axially extending passageway of said lower one of said two parts and the other of said two chambers so as to allow passage of gas between said two chambers located on opposite sides of said piston,
   said slot including a first step located continuous with said space, a second step extending perpendicular to said first step, a third step extending parallel to said first step and a fourth step extending parallel to said second step and leading to said axially extending passageway so that these are three 90° angles in said slot between said first and said fourth step.

5. A gas cylinder as claimed in claim 4, further comprising a valve shaft movable through said valve plug with a lower end of said valve shaft having a washer.

6. A gas cylinder as claimed in claim 5, wherein said washer includes a rabbet and an O-ring gasket which surrounds said valve shaft and is seated in said rabbet.

7. A gas cylinder as claimed in claim 4, wherein said shaft plug includes three parts.

8. A gas cylinder as claimed in claim 7, wherein an upper one of said three parts includes said passage of said shaft plug.

9. A gas cylinder as claimed in claim 8, wherein said upper one of said three parts engages said one end of said inner cylinder.

10. A gas cylinder as claimed in claim 4, wherein an upper one of said two parts of said valve plug engages said outer cylinder only.

11. A gas cylinder as claimed in claim 10, wherein said upper one of said two parts is reinforced by a washer.

* * * * *